United States Patent
Paul

(10) Patent No.: US 6,600,152 B2
(45) Date of Patent: Jul. 29, 2003

(54) DEVICE FOR TREATING A SUBSTRATE HAVING A ROTATING POLYGONAL MIRROR WITH INCLINED FACES AND A SYSTEM OF ADJACENT FOCUSING LENSES

(75) Inventor: Helmut Paul, Dachau (DE)

(73) Assignee: Carl Baasel Lasertechnik GmbH, Starnberg (DE)

( * ) Notice: Subject to any disclaimer, the term of this patent is extended or adjusted under 35 U.S.C. 154(b) by 0 days.

(21) Appl. No.: 09/827,713

(22) Filed: Apr. 6, 2001

(65) Prior Publication Data

US 2001/0038068 A1 Nov. 8, 2001

Related U.S. Application Data

(63) Continuation of application No. PCT/EP00/07427, filed on Aug. 1, 2000.

(30) Foreign Application Priority Data

Aug. 6, 1999 (DE) .......................................... 199 37 267

(51) Int. Cl.$^7$ ................................................. H01J 3/14
(52) U.S. Cl. ....................... 250/234; 250/236; 359/216; 347/261
(58) Field of Search ................................. 347/234, 248, 347/241, 260, 261; 359/212, 216, 217, 218; 358/493, 494; 250/234, 235, 236

(56) References Cited

U.S. PATENT DOCUMENTS 4,306,242 A * 12/1981 Jeffery ......................... 346/1.1
4,650,997 A * 3/1987 Yawn et al. .................. 250/236
4,915,465 A * 4/1990 Sugiura ....................... 350/6.5
5,774,248 A * 6/1998 Komatsu ..................... 359/204
5,818,546 A    10/1998 Opower et al. ............. 348/750
5,852,293 A * 12/1998 Iwasaki et al. .............. 250/235

FOREIGN PATENT DOCUMENTS

| DE | 37 28 660 A1 | 3/1989 |
| DE | 40 09 113 A1 | 10/1990 |
| DE | 44 28 202 A2 | 2/1996 |
| DE | 195 11 393 A1 | 10/1996 |
| DE | 197 13 826 A1 | 10/1997 |
| FR | 2.130.698 | 11/1972 |
| WO | WO 80/02393 | 11/1980 |

* cited by examiner

Primary Examiner—Stephone B. Allen
Assistant Examiner—Christopher W. Glass
(74) Attorney, Agent, or Firm—Laurence A. Greenberg; Werner H. Stemer; Gregory L. Mayback

(57) ABSTRACT

A device for treating a substrate with laser radiation is described. The device has a rotating polygon mirror with N reflecting surfaces which are used to direct a laser beam via a system of converting focusing lenses, whereby the focal planes of the lenses are located on a surface of the substrate. Active reflecting surfaces direct the laser beam onto the converging lens system, and subsequently on the substrate, while inactive reflecting surfaces have a different inclination to the active reflecting surfaces in relation to the converging lens system. The laser beam from the surfaces is directed onto an absorber. The large number of inactive reflecting surface helps to reduce serial hole density. When the laser is switched on and off while the inactive reflecting surfaces are being scanned, further reduction of serial hole density can be achieved.

10 Claims, 2 Drawing Sheets

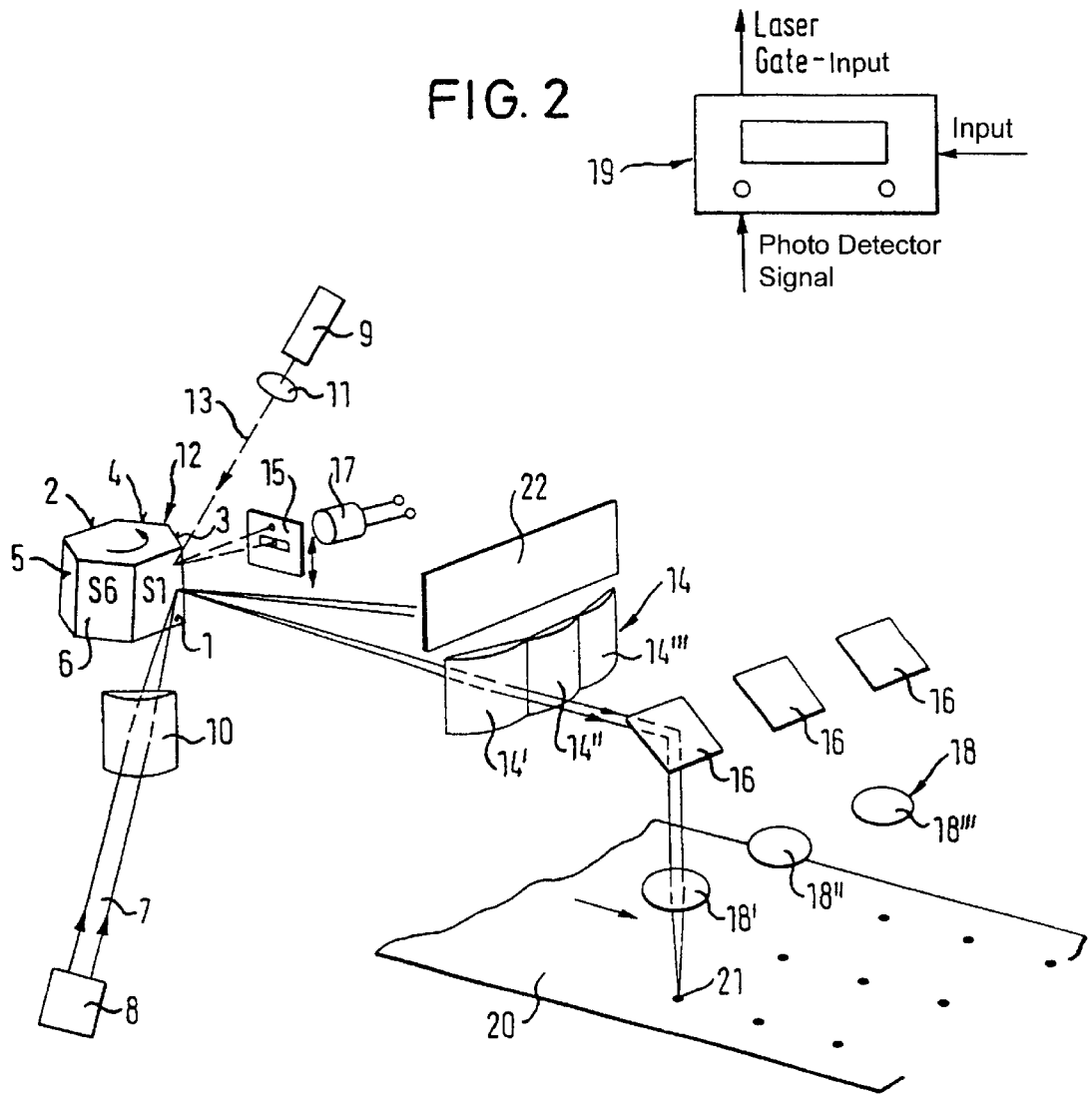

DEVICE FOR TREATING A SUBSTRATE HAVING A ROTATING POLYGONAL MIRROR WITH INCLINED FACES AND A SYSTEM OF ADJACENT FOCUSING LENSES

CROSS-REFERENCE TO RELATED APPLICATION

This application is a continuation of copending International Application No. PCT/EP00/07427, filed Aug. 1, 2000, which designated the United States.

BACKGROUND OF THE INVENTION

Field of the Invention

In the case of the application of lasers for treating or processing substrates, it is frequently necessary to apply lasers to the substrate in a plurality of target zones simultaneously or virtually simultaneously. The prior art discloses various refinements for this purpose in which in each case an incoming laser beam is swiveled with the aid of a rotating polygonal mirror over a row of juxtaposed, focusing elements, an appropriate number of target points being affected sequentially (see Published, French Patent Application FR 2 130 698 A, European Patent EP 0 028 615 B1, Published, Non-Prosecuted German Patent Application DE 195 11 393 A1). The known devices can be used to produce a plurality of tracks of perforated holes next to one another in a web-shaped material. The low level of energy that is required to produce a perforated hole permits the use of very high rotational speeds for the polygons. The hole densities within a perforation track are therefore very high, being up to 30 holes per centimeter of material, as is required, for example, in perforating cigarette tip paper.

However, substantially lower hole densities, that is to say much larger hole spacings, are required for perforating packaging materials such as, for example, plastic films, without aiming at a substantial change in the web speed and energy per hole. The lower hole densities serve the purpose of a higher tear resistance and a lower permeability.

It would certainly be possible in the case of the devices, known from the prior art, for treating substrates to achieve the desired large hole spacings in conjunction with low rotational speeds of the polygons, but the pulse energies would then be much too high while still achieving a clean hole. Counteracting this would require a reduction of the output power of the lasers, but this is not possible, or not possible to the required extent. It is not presently possible to manage an increase in the hole spacing by increasing the winding rate of the web-shaped material of the web to be perforated, because speeds of several thousand meters per minute would be required.

For specific applications, the prior art also discloses polygonal mirrors that are inclined in a specific way and with reference to the respective application. Published, Non-Prosecuted German Patent Application DE 40 09 113 A1 discloses a rotating polygonal mirror for a laser printer in the case of which the flat mirrors disposed around the axis of rotation and with their surfaces parallel to the axis of rotation are separated from one another by small connecting faces which have a surface, preferably a reflecting surface, which does not run parallel to the axis of rotation. As a result of this, the light reflected from the connecting faces does not impinge on the light-sensitive layer of the laser printer, but only the light scanned by the genuine reflecting faces. The aim is for the small connecting faces to reduce the air resistance resulting from the abutting edges between adjacent reflecting faces, and to reduce the noise produced during rotation. The inclination of the connecting faces results in that the light scanned on these faces cannot form ghost images on the light-sensitive bodies, and so the print quality of the laser printer is not worsened. Published, Non-Prosecuted German Patent Application DE 197 13 826 A1 describes a radar device which has a rotating polygonal mirror with a plurality of reflecting surfaces, of which each has a different inclination with reference to the axis of rotation of the polygonal mirror. A horizontal scanning operation is executed by rotating the polygonal mirror, while a vertical scanning operation is carried out by the reflecting surfaces with the various inclinations. At any time at which an incident beam is emitted toward a different reflecting surface, the horizontal scanning operation is repeated at a different height level that is proportional to the angles of inclination of each reflecting surface.

SUMMARY OF THE INVENTION

It is accordingly an object of the invention to provide a device for treating a substrate by laser radiation which overcomes the above-mentioned disadvantages of the prior art devices of this general type, in which the perforation patterns with a larger hole spacing than previously possible can be produced without the need to vary substantially the web speed and energy per hole.

With the foregoing and other objects in view there is provided, in accordance with the invention, a device for treating a substrate. The device contains a laser beam source outputting a laser beam, a system of focusing positive lenses disposed next to one another and having focal planes lying on a surface of the substrate to be treated, and a rotating polygonal mirror with N reflecting faces disposed upstream of the system of focusing positive lenses. The rotating polygonal mirror swivels the laser beam coming from the laser beam source over the system of focusing positive lenses and the system of focusing positive lenses providing various output beam paths. The rotating polygonal mirror has a number of active reflecting faces from which the laser beam is directed onto the system of focusing positive lenses. The rotating polygonal mirror has inactive reflecting faces with a different inclination than the active reflecting faces.

The main advantage of the present invention resides in the fact that a specific, preferably small, number of active reflecting faces are provided, of which the laser beam is reflected in the direction of the substrate. That is to say the active face of the polygonal mirror which is used for treating substrates is of comparatively small dimensions. A further advantage of the invention resides in the fact that during the time when the inactive reflecting faces are being swept over, the possibility arises for switching on and off the laser. The switching behavior of all commercially available $CO_2$ lasers does not permit the laser light to be switched on and off in the case of transition at the abutting edges of adjacent reflecting faces without the production of irregularities in the perforation. With the aid of these pauses, which become available owing to the inactive reflecting faces, a time domain is entered which is longer temporally by powers of ten and within which it is possible to switch $CO_2$ lasers on and off without delays and transient phenomena becoming visible in the perforation track.

Depending on the application, it can also be provided that a plurality of working planes are defined, that is to say there is a plurality of rows of positive lenses disposed next to one another, and each row is assigned a specific, preferably equal, number of active reflecting faces, the active reflecting faces having a different inclination for each row.

In accordance with an added feature of the invention, an absorber is disposed downstream of the rotating polygonal mirror and onto which the laser beam reflected from the inactive reflecting faces is directed.

In accordance with an additional feature of the invention, the system of focusing positive lenses contains a plurality of rows of focusing positive lenses disposed next to one another, and in that each row is assigned a specific number of the active reflecting faces, the active reflecting faces having a different inclination for each row.

In accordance with another feature of the invention, at least one of the inactive reflecting faces is disposed between adjacent ones of the active reflecting faces.

In accordance with a further feature of the invention, N is an even number, and in that two mutually opposite active reflecting faces are provided.

In accordance with another added feature of the invention, N is an even number, and in that two mutually opposite inactive reflecting faces are provided.

In accordance with another additional feature of the invention, there is an optical measuring device for detecting positions of the active and the inactive reflecting faces.

In accordance with another further feature of the invention, the optical measuring device contains a light source for emitting a measuring beam onto the polygonal rotating mirror, and a photodetector for detecting a measuring beam reflected from the polygonal rotating mirror.

In accordance with a further added feature of the invention, the optical measuring device has a slotted diaphragm disposed in front of the photodetector, and a position of the slotted diaphragm or the photodetector can be varied parallel to an axis of rotation of the polygonal rotating mirror.

In accordance with a concomitant feature of the invention, there is an electronic control connected to the laser beam source for switching on and off the laser beam when it sweeps over the inactive reflecting faces.

Other features which are considered as characteristic for the invention are set forth in the appended claims.

Although the invention is illustrated and described herein as embodied in a device for treating a substrate by laser radiation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a perspective view of a second embodiment of the device according to the invention for the treating substrates at a variable blanking rate by polygons and an electronic control system for switching off the laser.

DESCRIPTION OF THE PREFERRED EMBODIMENTS

Figure 1:
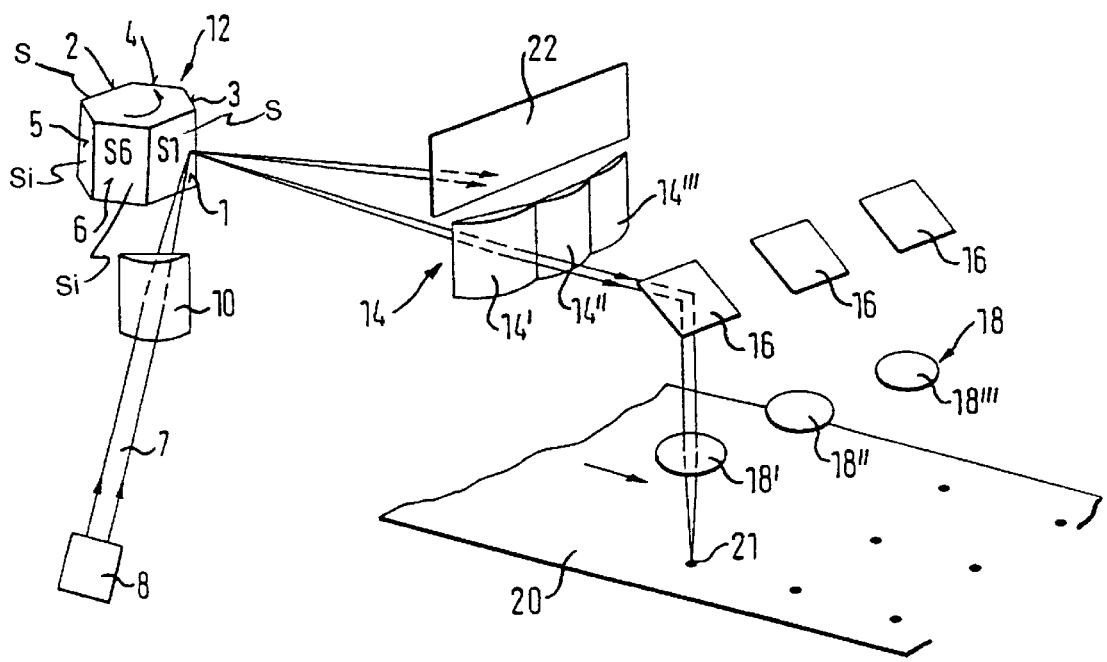
FIG. 1 is a diagrammatic, perspective view of a first embodiment of a device according to the invention for treating substrates at a fixed blanking rate, defined by polygons.

In all the figures of the drawing, sub-features and integral parts that correspond to one another bear the same reference symbol in each case. Referring now to the figures of the drawing in detail and first, particularly, to FIG. 1 thereof, there is shown a light beam 7 coming from a laser 8 that traverses a first positive lens 10, the plane of whose focal point or sweep lies on a face of a polygonal rotating mirror 12 disposed in a beam path downstream of the positive lens 10. The polygonal mirror 12 shown has six reflecting faces, of which a front reflecting face 1 and the opposite reflecting face 2 are constructed parallel to an axis of rotation of the polygonal rotating mirror 12. The reflecting faces 3 to 6 situated between the faces 1, 2 have a reflecting face Si which is inclined thereto. The number of the reflecting faces can be arbitrary and, for a given chopping frequency, it is also a function of the rotational speed that can be achieved with the polygonal rotating mirror 12. As the polygonal rotating mirror 12 rotates, the beam reflected from a reflecting face S (1 in this case) sweeps over a specific angular range in which there is disposed a first lens system 14 containing three individual positive lenses 14', 14", 14'". The positive lenses all have the same focal length and a position such that their focal point or their focal plane coincides with the focal point or the focal plane of the positive lens 10 on the polygonal mirror. The light that has left the lenses 14' to 14" is therefore directed in a parallel fashion once again. In the exemplary embodiment shown in FIG. 1, the light beams that have left the first lens system 14 are deflected by a deflecting mirror 16 by 90° and directed onto a system of focusing lenses 18 which contains individual spherical positive lenses 18', 18", 18'", which focus the parallel light beams impinging on them onto a web-shaped material 20 situated under or in the beam path downstream of the lens system 18. The spacing of the lens system 18 from the web 20 therefore corresponds to the focal length of the individual positive lenses 18', 18" and 18'". Upon further rotation of the polygonal rotating mirror 12, the next reflecting face Si (6 in this case) then comes into action and because of its inclination with respect to the axis or rotation, directs the laser beam 7 impinging on it onto an absorber 22 disposed above the lens system 14. Since in each case two inclined reflecting faces Si are provided in this case between the reflecting faces S, only ⅓ of the serial hole density is initially obtained by comparison with a standard device for treating substrates in accordance with the prior art mentioned at the beginning. A further reduction in the serial hole density can be achieved when use is made of the polygonal rotating mirror 12 with a substantially larger number of reflecting faces and, thereby, use is made of only two opposite reflecting faces S for perforation purposes, while all the other reflecting faces are provided as inclined reflecting faces Si.

In a development of the device according to the invention, a laser diode 9 with an optical system 11 is additionally provided in accordance with FIG. 2, its laser beam 13 being directed as a measuring beam 13 onto the same reflecting face (1 in this case) on which the processing laser beam 7 also impinges. The measuring beam 13 is deflected by the polygonal rotating mirror 12 onto a slotted diaphragm 15, downstream of which a photodetector 17 is disposed. The slotted diaphragm 15 works as a filter for distinguishing the various reflecting faces S (non-inclined) and Si (inclined). The slotted diaphragm 15 and the photodetector 17 can be adjusted in height in order to be able to be set in accordance with the inclination of the reflecting faces and the measuring beam reflected from the latter. The fast photodetector 17 conducts a measuring signal for the purpose of synchronization to an electronic control 19 with the aid of which the laser beam 7 can be switched on and off when the tilted reflecting faces Si are detected, that is to say when the laser beam sweeps over inactive reflecting faces Si. In order to generate the synchronized blanking signal, the measuring beam 13 can be aligned with any desired reflecting face S or Si which depends on the application. The electronic control 19 permits the laser 8, driven via the gate input, to be blanked in a synchronized fashion in relation to the position of the reflecting faces S and Si, it being possible for the operator to set a specific blanking factor. If, for example, in the case of a 16-beam perforation unit with a 14-facet polygonal rotating mirror two oppositely disposed reflecting faces are used to perforate in a first fan plane (working plane), the result is two regions each with six facets which direct the beam into a second fan plane and destroy it in the absorber. The result is only $\frac{1}{7}$ of the serial hole densities by comparison with a standard perforation unit. If the electronic system, which can detect the position of the reflecting faces S and Si in real time, is activated to blank the laser, it is possible to switch the laser on and off while the six facets are being swept over in each case. The serial perforation spacing can thereby be increased by integral multiples of the polygon-dependent basic factor (7 in this case), that is to say 7, 14, 21, 28 etc.

Depending on application, it is sufficient to use a fixed blanking ratio (basic factor) specified by the number N of the reflecting faces on the polygonal rotating mirror 12. However, multiple and variably settable hole spacings can only be achieved with the aid of the electronic blanking of the laser.

The reflecting faces to be situated parallel to the axis of rotation of the polygonal rotating mirror 12, and to be inclined with respect to this axis of rotation, depend on the individual case and, in addition to technical application reasons, can also be a function of production considerations. In any case, the subject matter of the invention is not limited to the exemplary embodiment described here, in which the active reflecting faces are situated parallel to the axis of rotation. Conversely, the inactive reflecting faces can likewise be situated parallel to the axis of rotation.

I claim:

1. A device for treating a substrate, comprising:
   a laser beam source outputting a laser beam;
   a system of focusing positive lenses disposed along side one another and having focal planes lying on a surface of the substrate to be treated; and
   a rotating polygonal mirror with N reflecting faces disposed upstream of said system of focusing positive lenses, said rotating polygonal mirror swiveling the laser beam coming from said laser beam source over said system of focusing positive lenses and said system of focusing positive lenses providing various output beam paths, said rotating polygonal mirror having a number of active reflecting faces from which the laser beam is directed onto said system of focusing positive lenses, said rotating polygonal mirror having inactive reflecting faces with a different inclination than said active reflecting faces.

2. The device according to claim 1, including an absorber disposed downstream of said rotating polygonal mirror and onto which the laser beam reflected from said inactive reflecting faces is directed.

3. The device according to claim 1, wherein said system of focusing positive lenses contains a plurality of rows of focusing positive lenses disposed next to one another, and in that each row is assigned a specific number of said active reflecting faces, said active reflecting faces having a different inclination for each row.

4. The device according to claim 1, wherein at least one of said inactive reflecting faces is disposed between adjacent ones of said active reflecting faces.

5. The device according to claim 1, wherein N is an even number, and in that two mutually opposite active reflecting faces are provided.

6. The device according to claim 1, wherein N is an even number, and in that two mutually opposite inactive reflecting faces are provided.

7. The device according to claim 1, including an optical measuring device for detecting positions of said active and said inactive reflecting faces.

8. The device according to claim 7, wherein said optical measuring device contains a light source for emitting a measuring beam onto said polygonal rotating mirror, and a photodetector for detecting a measuring beam reflected from said polygonal rotating mirror.

9. The device according to claim 8, wherein said optical measuring device has a slotted diaphragm disposed in front of said photodetector, and in that a position of one of said slotted diaphragm and said photodetector can be varied parallel to an axis of rotation of said polygonal rotating mirror.

10. The device according to claim 7, including an electronic control connected to said laser beam source for switching on and off the laser beam when it sweeps over said inactive reflecting faces.

* * * * *